United States Patent [19]

Park et al.

[11] Patent Number: 5,307,167
[45] Date of Patent: Apr. 26, 1994

[54] DIGITAL ZOOMING SYSTEM UTILIZING IMAGE BUFFERS AND EMPLOYING AN APPROXIMATED BILINEAR INTERPOLATION METHOD

[75] Inventors: Sung-Wook Park; Joon-Ki Paik, both of Buchon-shi, Rep. of Korea

[73] Assignee: SamSung Electronics Co, Ltd., Suwon, Rep. of Korea

[21] Appl. No.: 851,498

[22] Filed: Mar. 16, 1992

[30] Foreign Application Priority Data

Jun. 21, 1991 [KR] Rep. of Korea ............... 91-10353

[51] Int. Cl.[5] ............... H04N 3/223; H04N 5/14
[52] U.S. Cl. ............... 348/704; 348/571
[58] Field of Search ............... 358/180, 22, 140, 160, 358/428, 451; H04N 3/223, 5/14

[56] References Cited

U.S. PATENT DOCUMENTS

| | | | |
|---|---|---|---|
| 4,286,291 | 8/1981 | Taylor et al. | 358/13 |
| 4,334,245 | 6/1982 | Michael | 358/180 |
| 4,496,974 | 1/1985 | Heitmann | 358/180 |
| 4,528,585 | 7/1985 | Bolger | 358/22 |
| 4,660,081 | 4/1987 | Heerah | 358/22 |
| 4,661,987 | 4/1987 | Anderson et al. | 358/160 |
| 4,774,581 | 9/1988 | Shiratsuchi | 358/180 |
| 4,951,125 | 8/1990 | Kojima et al. | 358/180 |
| 5,008,752 | 4/1991 | Van Nostrand | 358/160 |
| 5,083,208 | 1/1992 | Katanaka | 358/180 |
| 5,125,042 | 6/1992 | Kerr et al. | 358/428 |

Primary Examiner—Mark R. Powell
Assistant Examiner—John W. Miller
Attorney, Agent, or Firm—Robert E. Bushnell

[57] ABSTRACT

The present invention relates to a digital zoom system utilizing image buffers and employing an approximated bilinear interpolation method. The zoom system includes an analog-to-digital (A/D) converter for converting an analog image signal to a digital image signal, an image buffer for storing the digital image signal generated for said A/D converter, a horizontal operation circuit for interpolating the digital image signal taken along with a horizontal direction, one or more horizontal image buffers for storing the digital image signal for 1-horizontal lines magnified in a horizontal direction, a vertical operation circuit for interpolating said horizontally magnified image signal in a vertical direction, a timing controller for controlling the image buffer, said horizontal and vertical operation circuits, and a digital-to-analog (D/A) converter for converting the digital image signal resultedly magnified in the horizontal and vertical direction back to analog image signal.

24 Claims, 7 Drawing Sheets

Original Image Data    Zoomed Image Data

| A | 10 | 20 | 30 | 40 |
| B | 20 | 30 | 40 | 50 |
| C | 30 | 40 | 50 | 60 |
| D | 40 | 50 | 60 | 70 |

| 10 | 17 | 25 | 32 | 40 |
| 17 | 25 | 32 | 40 | 47 |
| 25 | 32 | 40 | 47 | 55 |
| 32 | 40 | 47 | 55 | 62 |
| 40 | 47 | 55 | 62 | 70 |

O: Original Image
X: X1.25 Zoomed Image

DIGITAL ZOOMING SYSTEM UTILIZING IMAGE BUFFERS AND EMPLOYING AN APPROXIMATED BILINEAR INTERPOLATION METHOD

FIELD OF THE INVENTION

The present invention relates to a digital zooming system utilizing image buffers to produce a zoom effect, and more particularly to a zone system that employ an approximated bilinear interpolation, thereby simplifying its system architecture and quickly obtaining zoom features of approximately continuous magnification factors.

DESCRIPTION OF THE PRIOR ART

With the increase of various image processing systems, a digital zoom system has been required in many systems such as a digital camcorder to obtain a zoom effect by processing digital image signal. In practice, implementation of a conventional bilinear interpolation method, however, requires considerable complicated hardware.

The nearest neighbor interpolation method embodied out of the theory of an interpolation for a zoom process has an advantage that the hardware is simple, but has a disadvantage that the so-called "mosaic phenomenon" appears in the zoomed image.

To avoid the aforementioned problems associated with the conventional zoom system, various techniques have been proposed, for example, in U.S. Pat. Nos. 4,528,585, 4,302,776 and 4,774,581. In the U.S. Pat. No. 4,528,585, is a limitation that the variety of the magnification factors are restricted to a factor of 2,4 or 8. U.S. Pat. No. 4,302,776 which allows for step-wise continuous magnification factors to produce a zoom effect, but does not magnify the image in real time. In recent one of these system, set forth in the U.S. Pat. No. 4,774,581 which provides a possible means for magnifying the image in real time but is limited only a composite video signal for a television set.

SUMMARY OF THE INVENTION

Accordingly, an object of the present invention is to provide a zoom system capable of avoiding the disadvantages in the conventional zoom systems disclosed above. Another object of the present invention is to provide a zoom system capable of sufficiently magnifying the image, without a complicated hardware architecture. A further object of the present invention is to provide a zoom system capable of allowing wider selection of magnification factors to produce a zoom effect, without a complicated hardware architecture.

In order to achieve the stated object, a zoom system according to this invention comprises: an analog-to-digital (A/D) converter for converting an analog image signal into a digital image signal; as image buffer for storing the digital image signal generated from the A/D converter; a horizontal operation circuit for interpolation of the digital image signal in horizontal directions; one or more horizontal direction digital image buffers for storing image signal for a 1-horizontal line zoomed in a horizontal direction; a vertical operation circuit for interpolation of the horizontally interpolated image signal in a vertical direction; a timing controller for controlling the image buffer, horizontal and vertical operation circuits; and a digital-to-analog (D/A) converter for converting a resultant digital image signal output from the vertical operation circuit to an analog image signal.

The horizontal operation circuit includes first and second registers for temporarily storing input data, a plurality of multiplexers for respectively selecting one of the data from the first register or the second register in accordance with each of control signals, first and second average value calculators for respectively obtaining each of the mean values from the data selected by the multiplexers, a third average value calculator for obtaining resultant average value from the average values previously obtained by the first and second average value calculators, and a plurality of inverters for inverting a plurality of control signals to be applied to the plurality of the multiplexers. Each of the average value calculators consists of a plurality of full adders.

The vertical operation circuit includes a plurality of multiplexers for respectively selecting one of the data generated from horizontal operation circuit or the horizontal image buffer according to each of control signals similar to the control signals used in the horizontal operation circuit, first and second average value calculators for respectively obtaining the each of mean values from the data selected by the multiplexers, a third average value calculator for obtaining a resultant average value from the mean value generated by the first and second average value calculators, and a plurality of inverters for inverting the plurality of control signals to be applied to the plurality of the multiplexers.

The timing controller includes an address selector for estimating an address signal in conjunction with the respective zoom ratio and providing a write enable state to the image buffer, an image buffer controller for applying a write-clock and a read-clock to the image buffer and for providing a read address to the image buffer, and horizontal and vertical operation controllers for generating a plurality of control signals to control the horizontal and vertical operation circuit.

Each of the horizontal and vertical operation controllers comprises first to third counters and counter output selectors for each selecting one of the output data from the first to third counters in accordance with the zoom ratio. The address selector comprises zoom ratio address generators, counters, comparators, D flipflops, exclusive-OR-gates and an AND gate.

DETAILED DESCRIPTION OF THE PREFERRED EMBODIMENT

Hereinafter, a preferred embodiment of the present invention will now be described with reference to the accompanying drawings.

Figure 1:
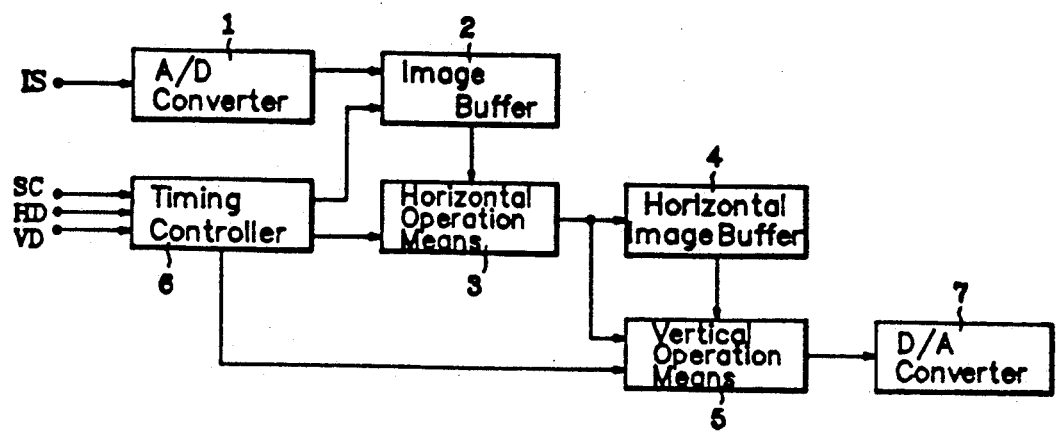
FIG. 1 is a schematic block diagram illustrating a preferred embodiment of the present zoom system which employs image buffers.
Figure 2:
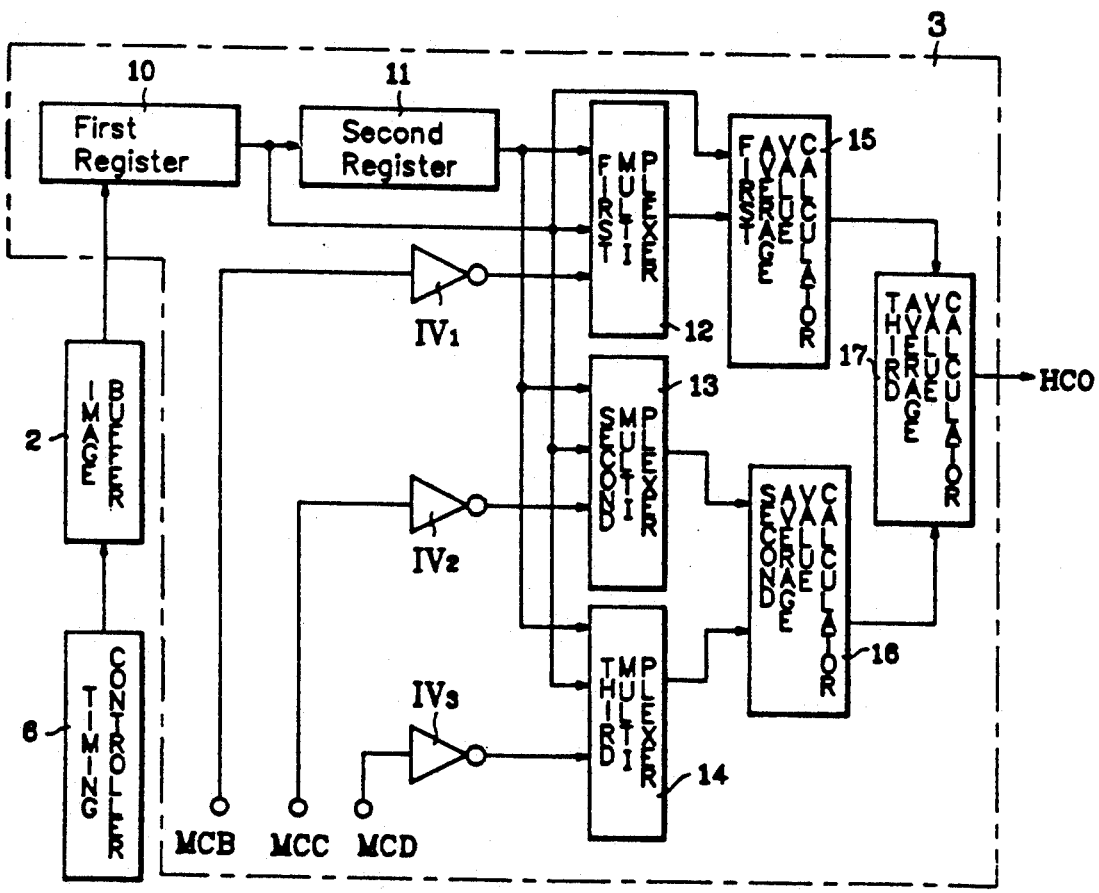
FIG. 2 is a schematic diagram of a horizontal operation circuit shown in FIG. 1.

Referring to FIG. 1, an input analog image signal is converted into a digital image signal by an analog-to-digital converter 1 (hereinafter called an A/D converter) and stored in an the digital image buffer 2. In this case, only image data to be magnified are subject to this storage. Then, a zoom system having a horizontal operation circuit 3, horizontal image buffer 4 and vertical operation circuit 5, employs an ABI (Approximated Bilinear Interpolation) method by using the data stored in the image buffer 2 to obtain the magnified image data. The magnified image data are converted by a digital-to-analog converter 7 (hereinafter called on D/A converter) to thereby obtain the analog image data. Herein, the horizontal operation circuit 3 interpolates the digital image signal in a horizontal direction, the horizontal image buffer 4 stores the horizontally magnified image data for a 1-horizontal line; and the vertical operation circuit 5 consequently interpolates the horizontally magnified image data in a vertical direction, resulting in the complete magnification of the image data under control of a timing controller 6. Also, the timing controller 6 generates a write address a read address and read clock in accordance with the respective zone ratio and applies them to the image buffer 2 and outputs control signals for controlling a first plurality of multiplexers 12, 13 and 14 of the horizontal operation circuit 3 and a second plurality of multiplexers 21, 22 and 23 of the vertical operation circuit, as shown in FIG. 2.

Now, the principle of ABI method will be described prior to the detailed description of the zoom system according to the present invention.

Figure 8:
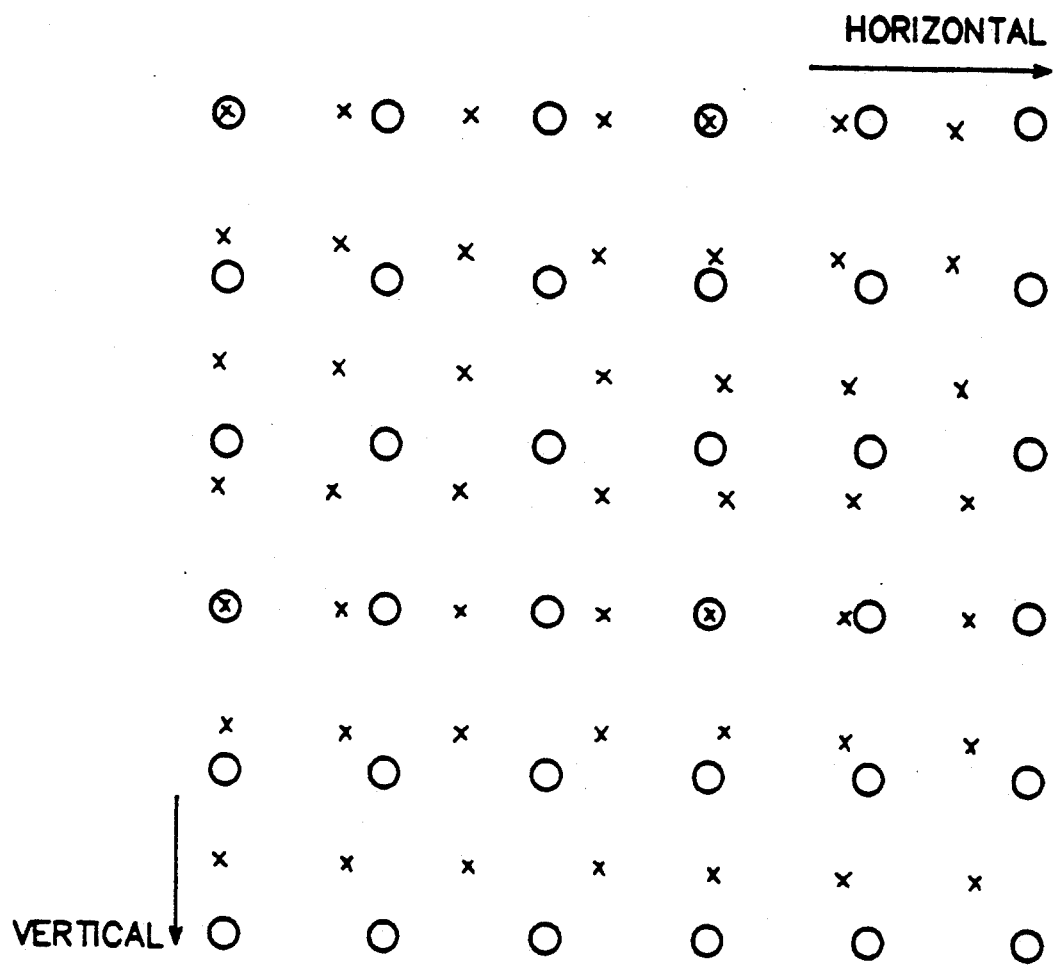
FIG. 8 is a schematic diagram illustrating an ABI (Approximated Bilinear Interpolation) method; and, FIG. 9 is a block diagram of the present zoom system embodied in a digital image stabilization system of a digital camcorder.

FIG. 8 shows an arrangement of the image data with a magnification of 1.25 for explaining the ABI method. In a method of obtaining interpolation data between arbitrary image data adjacent to each other when the image data a, b, c and d are obtained from the adjacent image data A and B, the values of the image data a, b, c and d are obtained by the following equations;

1. c (Zc)

$$Zc=c=(A+B)/2=((A+A)/2+(B+B)/2)/2$$

2. d (Zr)

$$Zr=d=(C+B)/2=((A+B)/2+B)/2+B)/2=\cdot((A+B)/2+(B+B)/2)2$$

3. b (Zl)

$$Zl=b=(A+C)/2=(A+(A+B)/2)/2=((A+A)/2+(A+B)/2)2$$

4. a (Z)

$$Z=a=A=((A+A)/2+(A+A)/2)/2$$

As is known from the above equations, the image data a, b, c and d have a final term expressed by the following pattern:

$$((X1+X2)/2+(X3+X4)/2)/2 \quad [2]$$

Therefore, the desired interpolation data can be obtained from the aforementioned way. In addition, if the computation is applied to obtain the values of vertical zoom on the basis of the value of horizontal zoom, the ABI operation is performed to allow the interpolation data of the desired magnification to be obtained.

With the aforementioned method, ABI values are obtained in the zoom ratio having multiples of 0.25, for example, X1.25, X1.5, X2, . . . . . . . . . , so that an effect of bilinear interpolation can be achieved by a small number of computing steps.

Next, referring to FIG. 2, the operation of the horizontal operation circuit 3 will be described. In FIG. 2, the horizontal operation circuit 3 receives the image data to be zoomed from the image buffer 2 and computes the horizontally interpolated data. The horizontal operation circuit 3 includes a first register 10 and a second register 11 for providing image data necessary to the interpolation operation. The image data of the registers 10 and 11 are selected by the first, second, and third multiplexers 12, 13, and 14.

Figure 6A:
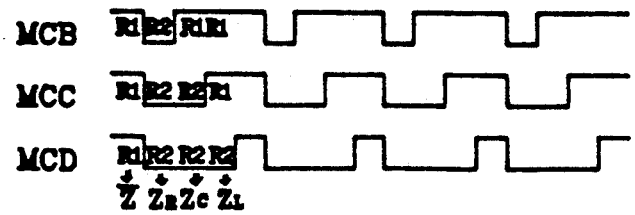
FIG. 6A to 6D are timing diagrams showing input/output signals of the respective circuit portions according to the present invention.
Figure 6B:
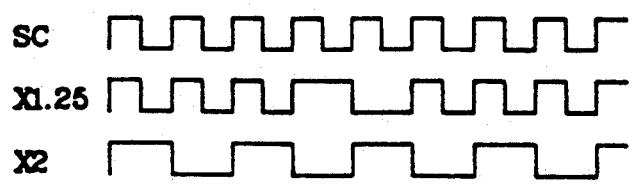

More particularly, the first, second, and third multiplexers 12, 13, and 14 select the data from the first and second registers 10 and 11 according to control signals MCB, MCC and MCD and output the selected data to control signals MCB. MCC and MCD and output the selected data to the average value calculators 15 and 16, respectively. That is, if the control signal MCB relative to 1.25 magnification is at a high level as shown in FIG. 6(a), the data of the first register 10 is selected by the first multiple 12 and output to the first average value calculator 15. On the contrary, if the control signal MCB is at a low level, the data of the second register 11 are selected by the first multiplexer 12 and output to the first average value calculator 15. Accordingly, the first average value calculator 15 computes the average value between the data inputted from the first register 10 when the control signal MCB is at a high level. Alternatively, the first average value calculator 15 computes the average value between the data of both the first and second register 10 and 11.

Similarly, if the control MCC relative to 1.25 magnifications is at a high level as shown in FIG. 6(a), the data of the first register 10 are selected by the second multiplexer 13 and output to the second average value calculator 16. On the other hand, if the control signal MCC is at a low level, the data of the second register 11 is selected by the second multiplex 13 and the selected data is output to the second average value calculator 16. Also, the control signal MCD relative to 1.25 magnification is at a high level, the data of the first register 10 is selected by the third multiplexer 14 and the data thus selected is output to the second average value calculator 16. If the control signal MCD is at a low level, the data of the second register 11 is selected by the third multiplexer 14 and then the selected data is applied to the second average value calculator together with the data from the first register 10 and the data of the second register 11 to compute the average value of these data.

Figure 3:
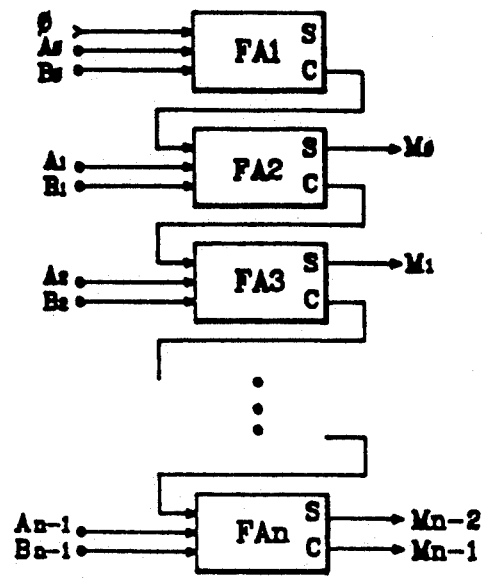
FIG. 3 is a schematic diagram of typical one of average value calculators shown in FIG. 2.

Meanwhile, each of the first, second, and the third average value calculators 15, 16, and 17 comprises a plurality of, n in this embodiment, full adders FA1 and FAn, as shown in FIG. 3. In this structure, each of the full adders adds the input data A and B and shifts its added output by one bit to obtain the average value between the data A and B. At this time, lack of MSB (most significant bit) due to the shifting operation is solved by using a carry bit from the upper adder. Furthermore, in the aforementioned method, the value below the decimal point, i.e., floating point value, is disregarded when the average value is obtained between the input data A and B. In this case, a problem of quality of image has not been caused as the result of simulation. Also, if an error due to disregard of the floating point value can be ignored, in the zoom ratio of 0.25 magnification it allows to obtain the same result as in the bilinear interpolation process.

Figure 4:
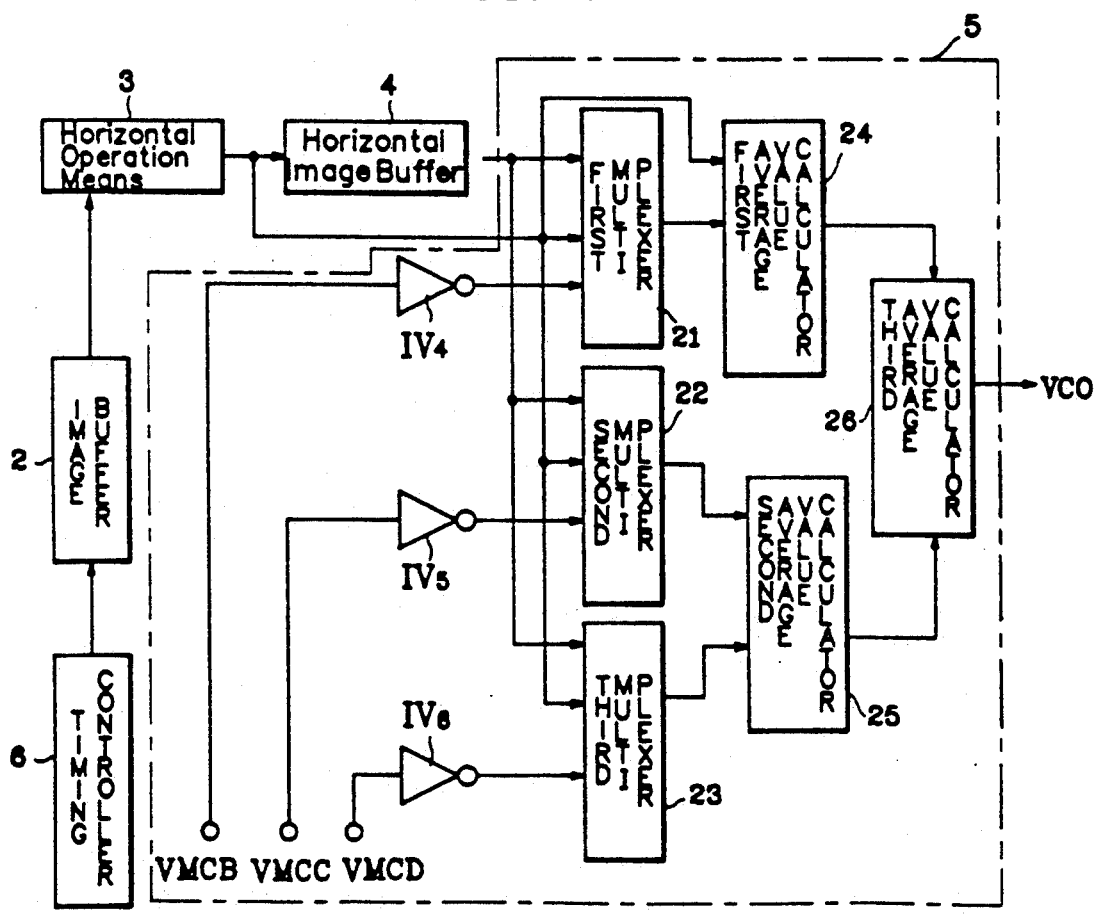
FIG. 4 is a schematic diagram of a vertical operation circuit shown in FIG. 1.

The structure of the vertical operation circuit 5 shown in FIG. 4 is similar to that of the horizontal operation circuit 3, with difference only in that there are a horizontal image buffer 4 instead of the second register 11 and control signals VMCB, VMCC and VMCD instead of the control signals MCB, MCC and MCD. Therefore, a detailed description will not be given for the sake of simplicity.

Figure 5:
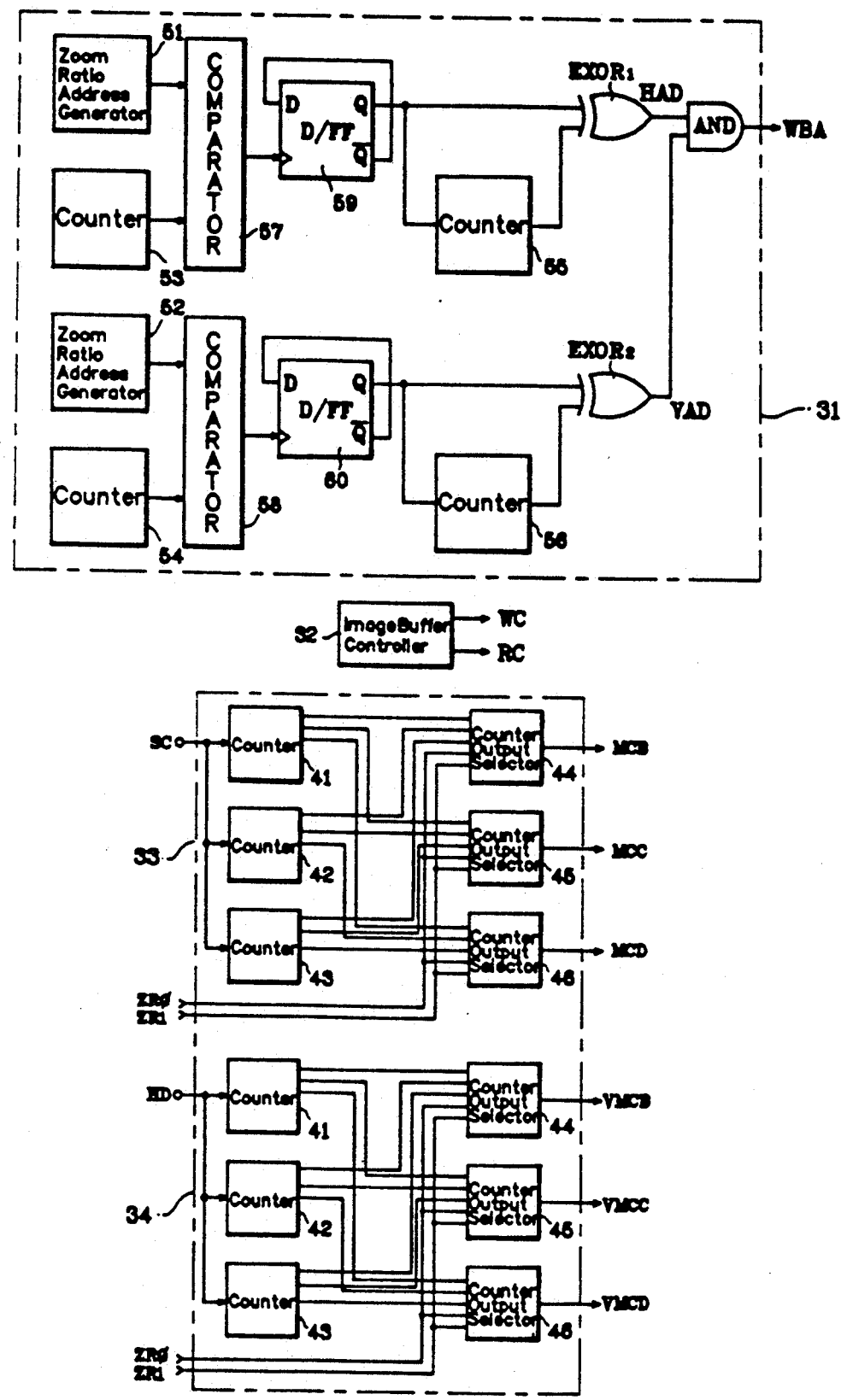
FIG. 5 is a schematic diagram of a timing controller shown in FIG. 1.
Figure 6C:
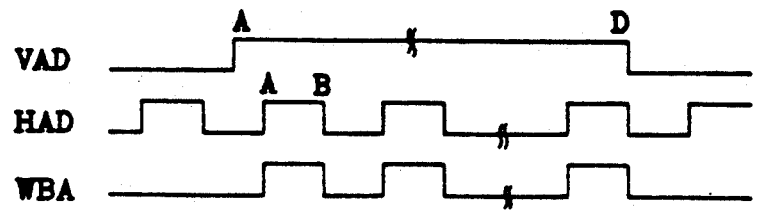

Referring to FIG. 5, showing the structure of the timing controller 6 which receives a system clock signal SC, a horizontal driving signal HD, a vertical driving signal VD and zooming ratio selecting signals ZR0 and ZR1 to generate a control signal corresponding to the zooming ratio, an address selector 31 selects an address for storing the image data into the image buffer 2 to provide the write enable state to the image buffer 2, so the image data to be stored in the image buffer 2 becomes different depending on the estimated zoom ratio. Thus, the horizontal address HAD and the vertical address VAD are generated by exclusive-OR gates EXOR1 and EXOR2 and these address HAD and VAD are resulted in AND logic by an AND gate and to designate vertical address and horizontal address, thereby enabling the write to the image buffer 2 [see FIG. 6C]. That is, in order to write the image data into the image buffer 2 in the vertical direction during the period A to B, a zoom ratio address generator 51 generates a value of A relative to the specified zoom ratio, and a counter 53 counts the horizontal address. Then, a comparator 57 compares the address generated from the zoom ratio address generator 51 with the output of the counter 53. If both values are the same, it means that the address A has been reached. At this time, the counter 55 counts up to address B. In this way, the image data can be written into the image buffer 2 in the vertical direction only during the period A to B. Similarly, in the write enable state of the image buffer 2, the image data can be written only during the period of A to D by counting the address of the vertical direction.

Meanwhile, the horizontal and vertical operation controllers 33 and 34 generates the control signals for controlling the horizontal operation circuit 3 and the vertical operation circuit 4. First to third counters 41 to 43 of the horizontal operation controller 33 count the input system clock signal SC to produce the control signals MCB, MCC and MCD for the respective zoom ratio, which are selected by means of counter output selectors 44 to 46 in accordance with the signals zooming ratio selecting ZR0 and ZR1, that is, the specified zoom ratio to output to the horizontal operation circuit 3. Alternatively, first to third counters 41 to 43 of the vertical operation controller horizontal driving 34 count the input signal HD to generate to the control signals VMCB, VMCC and VMCD for the respective zoom ratio, which are selected by the counter output selectors 44 to 46 on the basis of the zooming ratio selecting signals ZR0 and ZR1, that is, the zooming ratio, output to the vertical operation circuit 5.

Figure 6D:
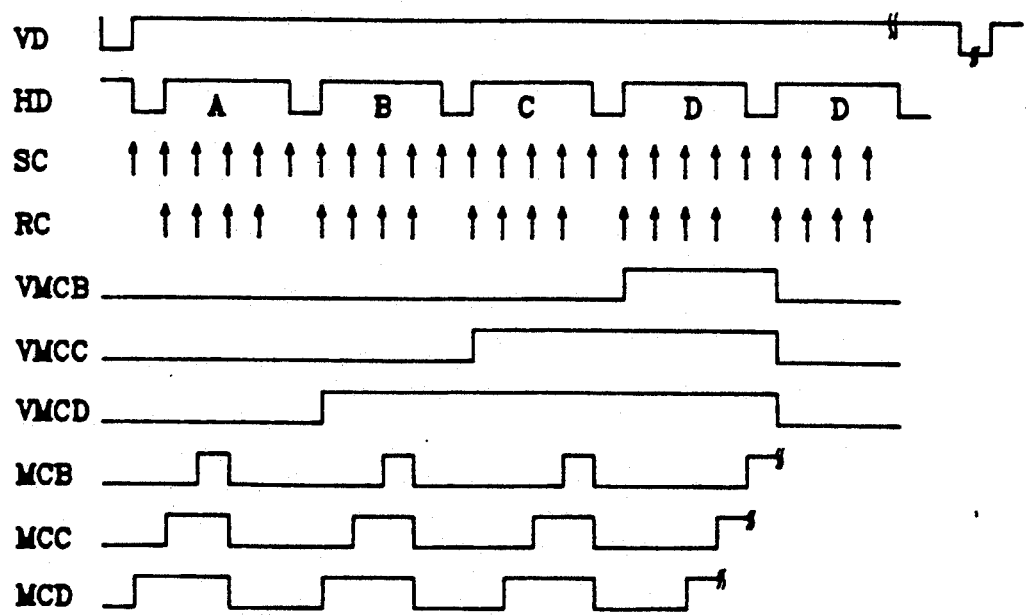

The image buffer controller 32 generates write clock signal WC and read clock signals RC of the image buffer 2 and designates read address of the image buffer 2, the write clock signal WC being the same with the system clock signal SC and the read clock signal RC and the read address varying according to the zoom ratio. In other words, in respect of the read clock signal RC, the original image have to be output four times while new image zoomed with the zoom ratio of 1.25 have to be output five times and thus the tread clock signal RC is also set depending on the original image output. This read clock signal RC for the respective zoom ratio is shown in FIG. 6D. In addition, in the read address, the horizontal lines are required to be read vertically twice or more. Herein, a number of the line required to changed according to the zoom ratio and therefore the appropriate read address is required in dependence upon the change of the line. If the zoom ratio is set to 1.25, the read address can be set in the following manner:

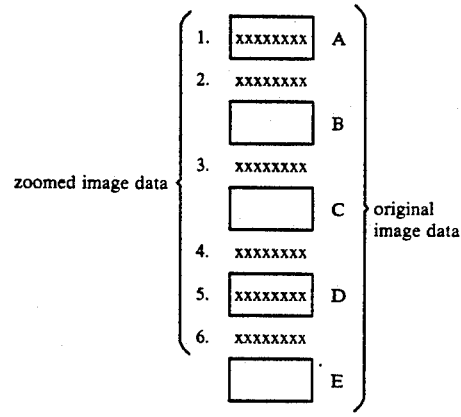

1 ⟶ A
2 ⟶ A · B
3 ⟶ B · C
4 ⟶ C · D
5 ⟶ D
6 ⟶ D · E output A at the line 1
output B at the line 2
output C at the line 3
output D at the line 4 output twice
output D at the line 5
output E at the line 6

Figure 7:
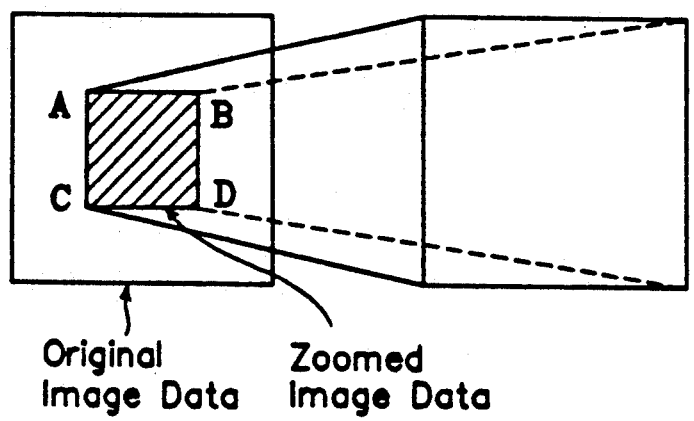
FIG. 7 shows the features of image data magnified by 5×5 from original image data of 4×4 with a zoom ratio of 1.25.

In this way, if the image data of 4×4 are zoomed with the zoom ratio of 1.25, the image data zoomed in 5×5 can be indicated, as shown in FIG. 7.

Figure 9:
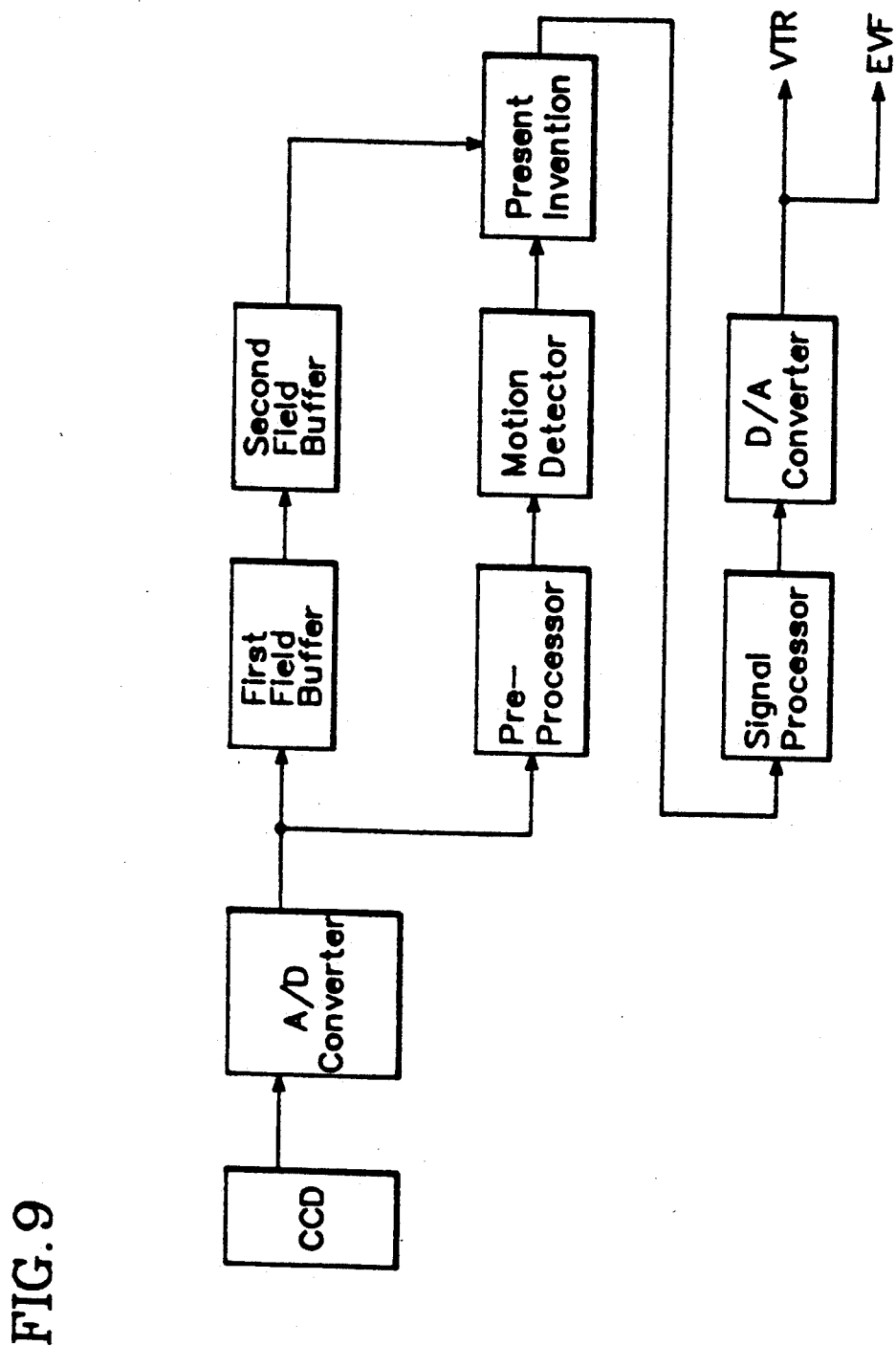

FIG. 9 shows an embodiment according to the digital zoom system of the present invention applicable to a digital image stabilization system (DIS) of a digital camcorder, wherein the digital image is processed through a pre-processor 500 and a motion detector 600 and then the movement of the image data relative to the original image is converted into a motion vector, so that the motion of the image data can be corrected in the opposite direction of the motion vector in order to accomplish the stabilization of the image. In this DIS system, it is required that motion of the image data to be corrected. If the correction is completed the and blanks are shown on the screen. Accordingly, the digital zoom system can be used for removing the blanks. More particularly, the image data are first stored in a first field buffer 300 and the desired data in the first field image data are written in a second field buffer 400 depending upon the motion vector, obtained by the motion detector and the specified zoom ratio. Next, the image data required to the zoom are read from the second field buffer and the read image data are subjected to zoom by means of the electronic zoom system of the present invention.

As described above, according to the digital zoom system using the image buffer of the present invention, since the zoom system utilizes the ABI method which neglects the floating point valves the structure of hardware is simplified and the magnification of the image is adjustable desirably in a range of 0.15, 0.065, . . . . . Also, since the image buffer and line buffer are provided to the zoom system, the magnification ratio can be variously exchanged and the real-time process can be effectively performed thereby allowing the zoom system to be applied to various image processing system, such as TV, VTR, video camcorder or the like.

What is claimed is:

1. A zoom system utilizing image buffers and an approximated bilinear interpolation method, comprising:
    first converter means for converting an analog image signal into a digital image signal;
    image buffer means for storing said digital image signal on a field-by-field basis;
    horizontal operation means for interpolating each field of said digital image signal stored in said image buffer means individually in a horizontal direction to provide a horizontally interpolated image signal;
    vertical operation means for interpolating each field of said horizontally interpolated image signal in a vertical direction to provide a vertically and horizontally interpolated image signal;
    timing controller means for controlling said image buffer means, said horizontal and vertical operation means in dependence upon a selected zoom ratio; and
    second converter means for converting said vertically and horizontally interpolated image signal into the analog image signal.

2. The zoom system according to claim 1, wherein said horizontal operation means comprises:
    first register means for temporarily storing said digital image signal on a field-by-field basis to provide a first register signal;
    second register means for temporarily storing the first register signal to provide a second register signal;
    plural multiplexer means for selectively enabling transmission of one of the first and second register signals in dependence upon reception of a plurality of control signals respectively representative of a plurality of zoom ratios; and
    plural average value calculator means for calculating average value of the first and second register signals output from said plural multiplexer means to selectively provide said horizontally interpolated image signal.

3. The zoom system according to claim 2, wherein each of said plural average value calculator means comprises a plurality of full adders.

4. The zoom system according to claim 1, wherein said vertical operation means comprises:
    buffer means for temporarily storing the horizontally interpolated image signal for 1-horizontal line to provide a horizontally buffered image signal;
    plurality multiplexer means for selectively enabling transmission of one of the horizontally interpolated image signal and the horizontally buffered image signal in dependence upon reception of a plurality of control signals respectively representative of a plurality of zoom ratios; and
    plural average value calculators means for calculating average values of the horizontally interpolated image signal and the horizontally buffered image signal output from said plural multiplexer means to selectively provided said horizontally and vertically interpolated image signal 5. The zoom system according to claim 1, wherein said timing controller means comprises:
    address selector means for estimating an address signal in dependence upon a respective zoom ratio and for write enabling said image buffer means;
    image buffer controller means for applying a write clock and a read clock to said image buffer means, and for providing a read address to said image buffer means; and
    horizontal and vertical operation controller means for generating said plurality of control signals respectively representative of said plurality of zoom ratios in dependence upon reception of a system clock signal, a horizontal driving signal and zooming ratio selecting signals.

6. The zoom system according to claim 5, wherein said address selector means comprises first and second zoom ratio address generators, first and second counters, first and second comparators, first and second D flip-flops, first and second exclusive-OR gates and an AND gate.

7. The zoom system according to claim 5, wherein said horizontal and vertical operation controller means comprises first, second and third counters and respective first, second and third counter output selectors for selecting an output from one of said first, second and third counters in accordance with said selected zoom ratio from said zooming ratio selecting signals.

8. A zoom system for a camcorder, comprising:
    means for receiving an image signal representative of an image;
    buffer means for storing said image signal in dependence upon a write enable signal, and for enabling transmission of said image signal in dependence upon a read enable signal;
    horizontal operation means for magnifying said image signal transmitted from said buffer means by an approximated bilinear interpolation of said image signal in a horizontal direction to provide a horizontally interpolated image signal in dependence upon a first plurality of control signals, said horizontal operation means comprising:
        first register means for temporarily storing said image signal to provide a first register image signal;
        second register means for temporarily storing the first register image signal to provide a second register image signal;

multiplexer means for providing a plurality of multiplexed signals by selectively enabling transmission of said first and second register image signals in dependence upon reception of said first plurality of control signals representative of a plurality of zoom ratios; and average value calculator means for calculating average values of the plurality of multiplexed signals to selectively provide said horizontally interpolated image signal;

vertical operation means for magnifying said horizontally interpolated image signal by an approximated bilinear interpolation of said horizontally interpolated image signal in a vertical direction to provide a vertically and horizontally interpolated image signal in dependence upon a second plurality of control signals; and timing controller means for controlling said image buffer means, and said horizontal and vertical operation means by generating said write and read enable signals, and said first and second plurality of control signals in dependence upon a selected zoom ratio.

9. The zoom system according to claim 8, wherein said image signal in being temporarily stored on a field-by-field basis in dependence upon said write enable signal.

10. The zoom system according to claim 8, wherein each of said plural average value calculator means comprises a plurality of full address.

11. The zoom system according to claim 8, wherein said vertical operation means comprises:

buffer means for temporarily storing the horizontally interpolated image signal 1-horizontal line to provide a horizontally buffered image signal;

multiplexer means for providing a plurality of multiplexed signal by selectively enabling transmission of the horizontally interpolated image signal and the horizontally buffered image signal in dependence upon said second plurality of control signals representative of a plurality of zoom ratios; and average value calculator means for providing said horizontally and vertically interpolated image signal by calculating average values of said plurality of multiplexed signals.

12. The zoom system according to claim 8, wherein said timing controller means comprises:

address selector means for estimating an address signal in dependence upon a respective zoom ratio to provide said write enable signal;

image buffer controller means for applying a write clock and a read clock to said image buffer means; and horizontal and vertical operation controller means for generating said first and second plurality of controls signals in dependence upon reception of a system clock signal, driving signals and zoom ratio selecting signals.

13. The zoom system according to claim 12, wherein said address selector means comprises:

means for generating a horizontal address signal representative of a selected horizontal period in the horizontal direction in dependence upon said selected zoom ratio;

means for generating a vertical address signal representative of a selected vertical period in the vertical direction independence upon said selected zoom ratio; and means for generating said write enable signal representative of a number of horizontal periods within said vertical period in dependence upon reception of said horizontal and vertical address signals.

14. The zoom system according to claim 12, wherein said horizontal and vertical operation controller means comprises;

a plurality of counters for providing a plurality of counting signals in response to said system clock signal and said driving signals; and a plurality of counter output selectors for generating said first and second plurality of control signals by selecting ones of said plurality of counting signals in accordance with said selected zoom ratio from said zoom ratio selecting signals.

15. A method for zooming an image for a camcorder utilizing an approximated bilinear interpolation, comprising the steps of:

receiving an image signal representative of an image;

generating write and read enable signals, and a plurality of control signals representative of a plurality zoom ratios;

temporarily storing said image signal in dependence upon said with enable signal, and for enabling transmission of the stored image signal in dependence upon said read enable signal;

magnifying said stored image signal in dependence upon an approximated bilinear interpolation of said image signal in a horizontal direction to generate a horizontally interpolated image signal in response to first ones of said plurality of control signals, said horizontally interpolated image signal being generated by successively storing said stored image signal to produce first and second register image signals, multiplexing between said first and second register image signals in dependence upon said first ones of said plurality of control signals, and calculating average values of the multiplexed signals;

magnifying said horizontally interpolated image signal in dependence upon an approximate bilinear interpolation of said horizontally interpolated image signal in a vertical direction to generate a vertically and horizontally interpolated image signal in response to second ones of said plurality of control signals.

16. The method for zooming an image according to claim 15, wherein said image signal is being temporarily stored on a field-by-field basis in dependence upon said write enable signal.

17. The method for zooming an image according to claim 15, wherein said step for providing the horizontal and vertically interpolated image signal comprises the steps of:

temporarily storing the horizontally interpolated image signal for 1-horizontal line to provide a horizontally buffered image signal;

generating a plurality of multiplexed signals by multiplexing the horizontally interpolated image signal and the horizontally buffered image signal in dependence upon said second ones of said plurality of control signals; and selectively generating said horizontally and vertically interpolated image signal by calculating average values of said plurality of multiplexed signals.

18. The method for zooming an image according to claim 15, wherein said step for generating write and read enable signals, and first and second plurality of control signals comprises the steps of:

generating a horizontal address signal respresentative of a selected horizontal period in the horizontal direction in dependence upon a selected zoom ratio;

generating a vertical address signal representative of a selected vertical period in the vertical direction in dependence upon said selected zoom ratio; and generating said write enable signal representative of a number of horizontal periods within said vertical period in dependence upon said horizontal and vertical address signals, generating said plurality of control signals in dependence upon a system clock signal, driving signals and zoom ratio selecting signals.

19. A zoom system utilizing image buffers and an approximated bilinear interpolation method, comprising:

means for receiving an image signal representing an image;

image buffer means for storing said image signal on a field-by-field basis;

horizontal operation means coupled to receive the image signal stored in said image buffer means on said field-by-field basis, for magnifying and interpolating each field of said image signal in a horizontal to generate a horizontally interpolated image signal;

vertical operation means coupled to receive said horizontal interpolated image signal on said field-by-field basis, for magnifying and interpolating each field of said horizontally interpolated image signal in a vertical direction to generate a vertically and horizontally interpolated image signal; and means for controlling said image buffer means, said horizontal and vertical operation means in dependence upon a selected zoom ratio.

20. The zoom system according to claim 19, wherein said horizontal operation means comprises:

first register means for temporarily storing said image signal on said field-by-field basis to provide a first register signal;

second register means for temporarily storing the first register signal to provide a second register signal;

first multiplexer means for providing a first multiplexed signal by multiplexing said first and second register signals and a first one of a plurality of control signals representative of a plurality of zoom ratios;

second multiplexer means for providing a second multiplexed signal by multiplexing said first and second register signals and a second one of said plurality of control signals;

third multiplexer means for providing a third multiplexed signal by multiplexing said first and second register signals and a third one of said plurality of control signals;

first calculator means for providing a first calculated signal by calculating averages of said first multiplexed signal and said first register signal;

second calculator means for providing a second calculated signal by calculating averages of said second and third multiplexed signals; and third calculator means for providing said horizontally interpolated image signal by calculating averages of said first second calculated signals.

21. The zoom system according to claim 19, wherein said vertical operation means comprises:

horizontal image buffers means for temporarily storing said horizontally interpolated image signal on said field-by-field basis to provide a horizontal buffered image signal;

first multiplexer means for providing a first multiplexed signal by multiplexing said horizontally interpolated image signal and said horizontal buffered image signal and a first one of a plurality of control signals representative of a plurality of zoom ratios;

second multiplexer means for providing a second multiplexed signal by multiplexing said horizontally interpolated image signal and said horizontal buffered image signal and a second one of said plurality of control signals;

third multiplexer means for providing a third multiplexed signal by multiplexing said horizontally interpolated image signal and said horizontal buffered image signal and a third one of said plurality of control signals;

first calculator means for providing a first calculated signal by calculating averages of said first multiplexed signal and said first register signal;

second calculator means for providing a second calculated signal by calculating averages of said second and third multiplexed signals; and third calculator means for providing said vertically and horizontally interpolated image signal by calculating averages of said first and second calculated signals.

22. A method for zooming an image utilizing an approximated bilinear interpolation, comprising the steps of:

receiving an image signal representing an image;

storing said image signal onto a memory on a field-by-field basis;

generating a horizontal interpolated image signal by magnifying and interpolating each field of said image signal retrieved from said memory in a horizontal direction on said field-by-field basis;

generating a vertically and horizontally interpolated image signal by magnifying and interpolating each field of said horizontally interpolated image signal in a vertical direction on said field-by-field basis; and controlling generation of said horizontal interpolated image signal and said vertically and horizontally interpolated image signal in dependence upon a selected zoom ratio.

23. The method according to claim 22, wherein said horizontal interpolated image signal generating step comprises the steps of:

temporarily storing said image signal on said field-by-field basis to provide a first register signal;

temporarily storing the first register signal to provide a second register signal;

generating a first multiplexed signal by multiplexing said first and second register signals and a first one of a plurality of control signals representative of a plurality of zoom ratios;

generating a second multiplexed signal by multiplexing said first and second register signals and a second one of said plurality of control signals;

generating a third multiplexed signal by multiplexing said first and second register signals and a third one of said plurality of control signals;

generating a first calculated signal by calculating averages of said first multiplexed signal and said first register signal;

generating a second calculated signal by calculating averages of said second and third multiplexed signals; and generating said horizontally interpolated image signal by calculating averages of said first and second calculated signals.

24. The method according to claim 22, wherein said vertically and horizontally interpolated image signal generating step comprises the steps of:

temporarily storing said horizontally interpolated image signal on said field-by-field basis to provide a horizontal buffered image signal;

generating a first multiplexed signal by multiplexing said horizontally interpolated image signal and said horizontal buffered image signal and a first one of a plurality of control signals representative of a plurality of zoom ratios;

generating a second multiplexed signal by multiplexing said horizontally interpolated image signal and said horizontal buffered image signal and a second one of said plurality of control signals;

generating a third multiplexed signal by multiplexing said horizontally interpolated image signal and said horizontal buffered image signal and a third one of said plurality of control signals;

generating a first calculated signal by calculating averages of said first multiplexed signal and said first register signal;

generating a second calculated signal by calculating averages of said second and third multiplexed signals; and generating said vertically and horizontally interpolated image signal by calculating averages of said first and second calculated signals.

* * * * *